United States Patent Office 3,826,850
Patented July 30, 1974

3,826,850
PREPARATION OF BAKED GOODS HAVING SOURDOUGH FLAVOR WITHOUT A SOURDOUGH STARTER
David R. Shenkenberg, Alexandria, and Faye G. Barnes, Arlington, Va., and Byron H. Webb, Harpers Ferry, W. Va., assignors to the United States of America as represented by the Secretary of Agriculture
No Drawing. Filed Oct. 18, 1971, Ser. No. 190,321
Int. Cl. A21d 2/14, 2/34
U.S. Cl. 426—25       1 Claim

ABSTRACT OF THE DISCLOSURE

Sourdough flavored bread and other baked products are made without the use of the traditional sourdough starter sponge. The distinctive taste of sourdough baked products is obtained by substituting acid whey and vinegar or acetic acid for the starter sponge. Special yeast that will grow only at pH levels below 4.0 are not needed; good leavening is obtained at higher pH values with regular baker's yeast. Of significance to the baking industry is that the process provides for uniformity of product and can be done with standard baking equipment using standard baking procedures.

A non-exclusive, irrevocable, royalty-free license in the invention herein described, throughout the world for all purposes of the United States Government, with the power to grant sublicenses for such purposes, is hereby granted to the Government of the United States of America.

This invention relates to novel means of making sourdough bread and rolls. More specifically it relates to a process in which acid whey and vinegar are used to obtain sourness and in which the traditional drawn out, generally unacceptable, two-stage sourdough fermentations are not needed.

The traditional method for making sourdough bread, otherwise known as San Francisco Sourdough Bread, is time consuming, cumbersome and impractical for most commercial bakeries. The procedure is not only quite different from customary breadmaking methods but it also requires the use of special equipment. Currently San Francisco sourdough bread is made by the following steps:

1. Maintaining a continuous starter sponge comprised of two parts (40%) previous sponge, two parts (40%) flour and one part (20%) water by rebuilding every eight hours or three times a day;
2. Mixing the starter sponge with other ingredients in the following proportions to make the sour bread dough: 20 parts starter sponge, 100 parts flour, 60 parts water and 2 parts salt;
3. Subjecting the sour bread dough to about one-half hour time for makeup, scaling and moulding and then proofing for eight hours at 86° F.
4. Slashing the molded dough to provide surface cuts for proper crust formation.
5. Baking the proofed loaf in a high humidity atmosphere at temperature of 375–400° F. for 45–50 minutes.

Three sponge transfers a day and long proof times are necessary in order to obtain proper acid development and leavening. The sour character is developed through the bacterial production of lactic and acetic acid. The dough has a pH between 3.9 and 4.0 after the bacterial fermentation and about from 0.06 to 0.10 meq. acidity/gram. The acid and yeast fermentations proceed concurrently to complete the double fermentation. As expected, in addition to its leavening action, the yeast contributes some flavor characteristics to the product.

It is apparent from the preceding description that the traditional process of making sourdough bread is time consuming and does not lend itself to most commercial bread making operations. In fact, this is why the commercial production of sourdough products is, for the most part, limited to the northern California area around San Francisco.

An object of this invention is to provide a new, simple method of making bread and rolls having the characteristics of San Francisco sourdough products.

Another object of this invention is to provide a method of making sourdough products that does not require the use of or propagation of the sourdough starter.

A still further object is to provide a method of making sourdough products through the use of acid whey and vinegar or acetic acid.

According to this invention, the above objects are accomplished by a process which eliminates the need for a sourdough starter sponge and the bother associated with its propagation and maintenance. In this invention the distinctive taste of sourdough baked products is obtained by the substitution of acid whey and vinegar or acetic acid for the sourdough starter sponge.

The use of acid whey in making sourdough bread has several advantages over the traditional method. For example, it provides additional nutrients such as milk proteins, minerals and sugars. The acid level of the product can be uniformly and reliably controlled. A product having the meq of acidity as the traditional sourdough bread but with a significantly higher pH level can be obtained because of the buffering effect of the whey constituents. In other words, the distinctive characteristics of sourdough baked products are provided without the need for special yeast that will grow only at pH levels of 4.0 or below. In this invention good leavening is obtained at the higher pH level of about 4.5 with the use of regular baker's or other yeast which would not grow at a pH level of 4.0. This accomplishment is of great significance and importance to commercial bakeries because it provides a means for them to make sourdough baked products with the customary baking ingredients in existing equipment by standard procedures.

For the purposes of this invention acid whey includes concentrated and dried acid whey as well as whey in the unconcentrated state as when it is drained from a vat. The quantity of whey ingredient can be varied to suit the particular characteristics desired in the product.

The acid whey ingredients may be the by-product of a number of traditional cultured dairy products, such as cottage cheese, acid casein, and quarg. Sweet whey to which a suitable quantity of edible acid is added may also be used. Wheys resulting from products made by direct acidification may also be used. Also wheys such as low lactose whey from which a portion or all of one or more of its constituents has been removed may be used.

This invention is a new and important contribution to the baking industry because it provides the industry with the means to make uniform sourdough baked products without the drawback of having to maintain a sourdough starter sponge and without having to be dependent on the vicissitudes of bacterial fermentation during dough making and proofing. It also provides a means by which the acid levels in the baked product can be closely controlled and by which sourdough products can be made without having to resort to special leavening agents and special equipment.

Two methods, the straight dough method and the sponge and dough methods, for making sourdough breads and baked products will now be illustrated. These methods may be varied to obtain products suited to individual preferences and tastes.

EXAMPLE 1

Straight Dough Method

Dry yeast is rehydrated and the following ingredients are combined at low speed mixing:

| Ingredients | Parts by Weight |
|---|---|
| Flour | 100 |
| Water | 35 |
| Yeast, dry | 1.25 |
| Salt | 2.0 |
| Concentrated acid whey (28% TS, 2.4% TA)[1] | 25.0 |
| Vinegar (50 grain) | 7.0 |

[1] TS=Total Solids, TA=Titratable acidity.

The ingredients are then mixed at high speed to optimum gluten development. The fully developed dough is then scaled, fermented for 3 hours, moulded, and proofed to height at 98–100° F., 90% R.H. (relative humidity). The fully proofed dough is then baked into bread or rolls or partially baked for finishing at a future time.

EXAMPLE 2

Sponge and Dough Method

Dry yeast is rehydrated and thoroughly mixed with flour and water in the proportions shown below to form the sponge which is allowed to ferment for 4 hours at 82° F., 90% R.H.

| Ingredients | Parts by weight Sponge | Parts by weight Dough |
|---|---|---|
| Flour | 50 | 50 |
| Yeast, dry | 1.25 | |
| Water | 35 | 5.0 |
| Salt | | 2.0 |
| Concentrated acid whey (28% TS, 24% TA)[1] | | 19.4 |
| Vinegar (50 grain) | | 6.1 |

[1] TS=Total Solids; TA=Titratable Acidity.

The fermented sponge is then mixed with the ingredients shown to form the dough. The ingredients are then mixed at high speed to optimum gluten development. The fully developed dough is given 30 minutes floor time before scaling. A fifteen-minute intermediate proof follows scaling, after which the dough is sheeted, moulded and proofed to height at 90–100° F., 90% R.H. The fully proofed dough is then baked into bread or rolls or partially baked for finishing at a future date.

We claim:

1. In a process for making bread and other baked products in which the dough ingredients, including bakers' yeast and flour, are mixed, fermented, and then baked, the improvement comprising incorporating into the dough ingredients a 50 grain vinegar and a concentrated acid whey having 28% total solids and a titratable acidity of 2.4%, said vinegar and acid whey constituting from 6 to 7 parts by weight and from 19 to 25 parts by weight, respectively, per 100 parts by weight of flour in the dough and providing the dough with a pH of about 4.5 and an acid level ranging between 0.06 and 0.10 milliequivalents acidity per gram of baked product, thereby producing in the baked products the distinctive flavor and taste of sourdough bread and baked products.

References Cited

UNITED STATES PATENTS

| | | | |
|---|---|---|---|
| 3,053,666 | 9/1962 | Henika et al. | 99—91 X |
| 3,650,764 | 3/1972 | Duquette | 99—91 X |

RAYMOND N. JONES, Primary Examiner

J. R. HOFFMAN, Assistant Examiner